United States Patent [19]
Wallace

[11] 3,964,644
[45] June 22, 1976

[54] ADHESIVE DISPENSING APPARATUS
[75] Inventor: Ray H. Wallace, Rockland, Mass.
[73] Assignee: Transworld Adhesive & Chemical Corporation, Rockland, Mass.
[22] Filed: Sept. 26, 1974
[21] Appl. No.: 509,335

[52] U.S. Cl. .................. 222/146 HE; 222/334; 226/128; 226/150; 226/162; 279/58
[51] Int. Cl.² ........................................ B67D 5/62
[58] Field of Search ............ 222/146 HE, 334, 391; 226/53, 127, 128, 150, 158, 162; 401/1, 2; 279/58

[56] References Cited
UNITED STATES PATENTS

| | | | |
|---|---|---|---|
| 2,493,680 | 1/1950 | Martin | 279/58 X |
| 3,314,574 | 4/1967 | Longval et al. | 222/146 HE |
| 3,818,930 | 6/1974 | Crum et al. | 222/146 HE X |

FOREIGN PATENTS OR APPLICATIONS

| | | | |
|---|---|---|---|
| 714,996 | 11/1941 | Germany | 226/158 |

Primary Examiner—Stanley H. Tollberg
Assistant Examiner—Frederick R. Handren
Attorney, Agent, or Firm—Robert A. Cesari; John F. McKenna; Andrew F. Kehoe

[57] ABSTRACT

An improved fluid-operated dispensing apparatus for use in receiving, processing, and applying rods of hot-melt adhesive. Important characteristics of the apparatus include an air-cooling means adapted to operate when the dispensing function is not being operated, and a means for gripping the adhesive rod to assure a uniform advance through the apparatus to the heating zone. Moreover, the use of a drive piston assembly, which is annular with respect to the rod being processed, enables the manufacture of an unusually compact tool.

13 Claims, 12 Drawing Figures

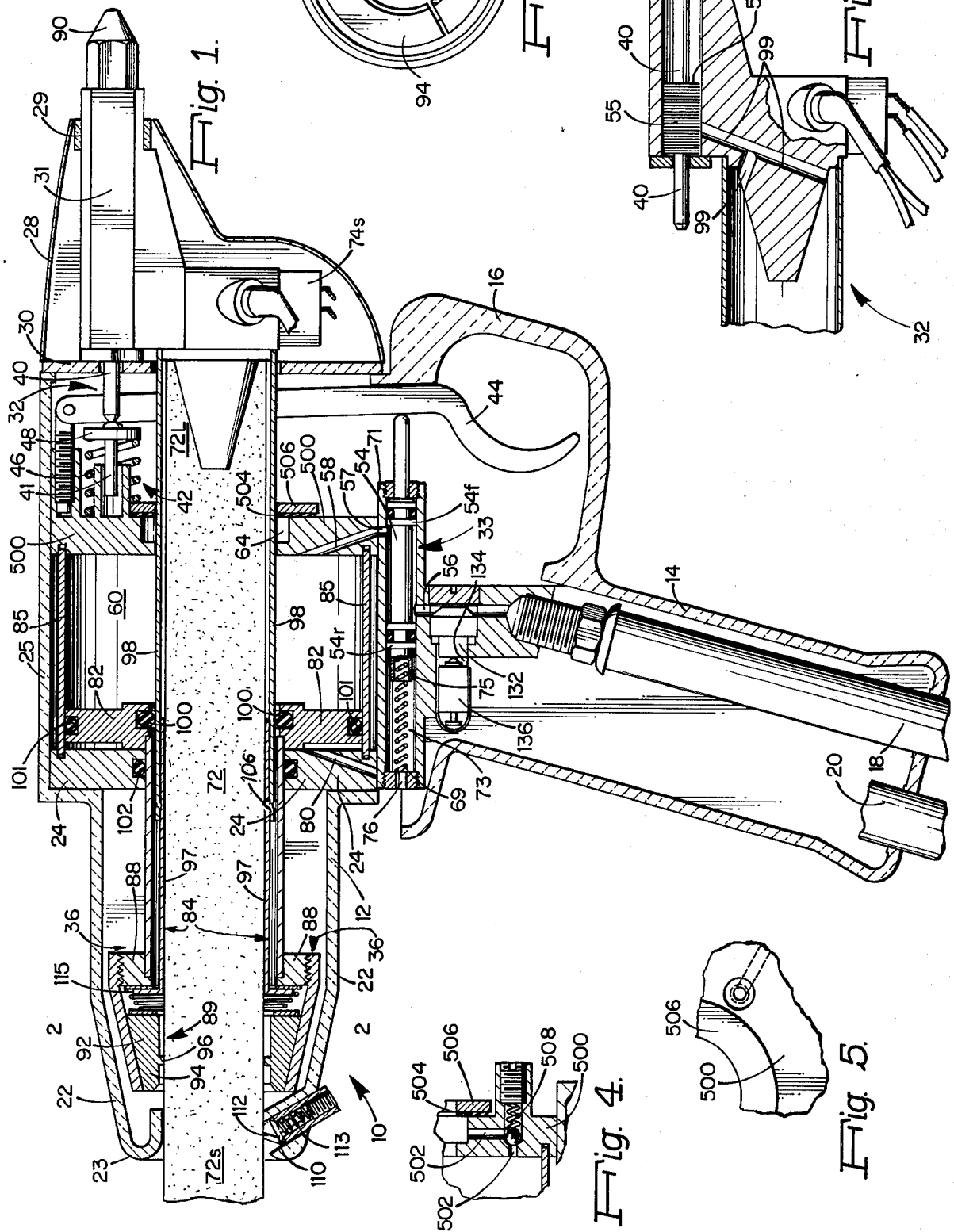
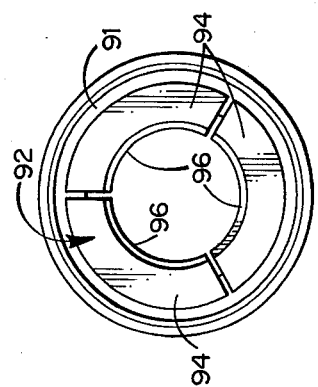
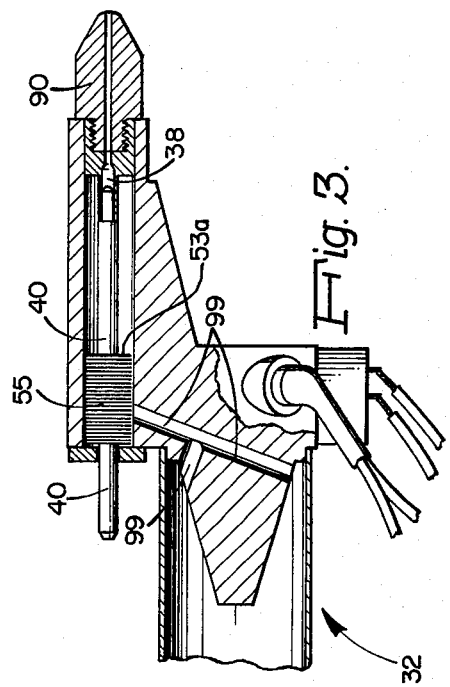
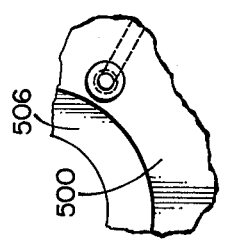

ADHESIVE DISPENSING APPARATUS

BACKGROUND OF THE INVENTION

A considerable amount of effort has been expended in the development of apparatus which is adapted to receive sticks or rods of hot-melt adhesive, heat them to melting, and allow their controlled application to the surfaces to be bonded by the adhesive. In general, the problems encountered by the prior art inventors, and evidenced by the apparatus they have developed, include the mechanical problems associated with achieving a compact apparatus, achieving good adhesive-heating capacity, and achieving a dependable advancement of the unmelted adhesive through the gun without fouling of the gun by the adhesive.

Among the tools disclosed in the prior art is that disclosed in U.S. Pat. No. 3,587,930. This device is adapted to receive a stick of glue which is pushed from its rearward position, by a piston, towards a heating zone in which the glue is melted. There is a small and continuous air stream bled around the adhesive stick in an attempt to keep the stick from melting prematurely.

Other devices are disclosed in all of the following U.S. Pat. Nos. 2,742,143; 2,995,159; 3,314,574; 3,774,817, 3,612,357; 3,587,930; and 3,743,142. In general, none of these tools achieve the desirable positive advancement of the adhesive without some substantial sacrifice in terms of mechanical simplicity or dispensing capacity. As will be described in some detail below, one of the problems of the earlier apparatus relates to the means whereby the apparatus grips the adhesive. In some cases, (e.g. U.S. Pat. Nos. 2,995,159 and 3,612,357) the glue stick must be of a particular shape. In other cases (e.g. U.S. Pat. Nos. 2,742,142; 3,774,817; and 3,314,574) the selective engagement of only part of the adhesive rod presents a problem in the uniform advancement of the adhesive stick which, depending upon the precise adhesive being used, may have substantial plasticity in the gripping area. Some U.S. Pat. Nos. (e.g. 3,743,142 and 2,437,263) disclose adhesive advancement means either engaging or spaced around a substantial segment of the circumference of the adhesive stick. But these advancement means do not adequately grip into a plastic adhesive rod.

Other apparatus comprises using constant pressure on the adhesive and consequently is susceptible to fouling by unwanted extrusion of the adhesive into parts of the gun where it is troublesome.

Thus, in general, there has been a need to provide a simple, more compact dispensing apparatus adapted to achieve a reliable and repeatable advance of hot melt adhesives.

It is to be noted that the comments on the problems of the prior art are made in hindsight, i.e., in view of the claimed invention. It is not to be inferred from this discussion that all of these problems were recognized in the prior art.

SUMMARY OF THE INVENTION

Therefore, it is a principal object of the invention to provide an improved pneumatic dispenser of hot-melt adhesives.

A further object of the invention is to provide apparatus which may be used advantageously with a wide variety of adhesive formulations as a consequence of an improved adhesive-gripping mechanism and as a consequence of improved thermal insulating means between heating and advancement zones of the apparatus.

Another object of the invention is to provide a novel advancement means for the adhesive, on which comprises an annular-shaped piston assembly.

Still another object of the invention is to provide an internally heated, compact, hot-melt adhesive dispenser which is economical to produce, easy to use, and has an extraordinary output capacity in view of its size and weight.

Another object of the invention is to provide novel processes for handling and processing hot-metal adhesives.

Other objects of the invention will be obvious to those skilled in the art on reading this disclosure.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particular case.

IN THE DRAWINGS

FIG. 1 is a side view, in section, of the apparatus of the invention; it is partly schematic in illustration of air pathways more detail being shown in FIG. 9.

FIG. 2 is a section through Lines 2 — 2 FIG. 1.

FIG. 3 shows a side view, partially in section, of the needle valve assembly used in the apparatus of the invention and the heating element used therewith.

FIG. 4 is a fragmentary section of the front end plate of the pneumatic cylinder used in the apparatus.

FIG. 5 is a fragmentary end view of the front end plate of the aforesaid pneumatic cylinder.

Figure 6:
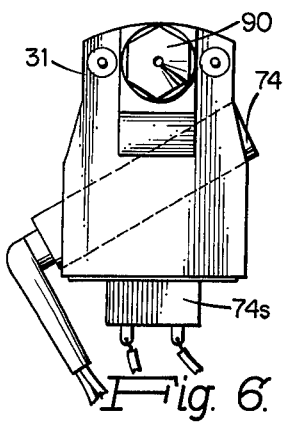
FIGS. 6 and 7 show rear and front views, respectively, of the assembly of FIG. 3.
Figure 7:
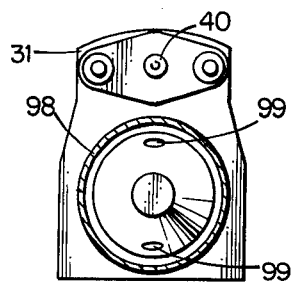

Referring to FIG. 1, it is seen that dispensing tool 10 comprises a housing 12 mounted on a handle 14 which also includes a trigger guard 16. Conduits 18 and 20 run into handle 14 and form means to supply pneumatic and electrical energy to the tool. Housing 12 consists of a rear housing member 22 which is ope-nended and terminates in an inwardly-curved flange 23 providing means for adhesive to enter the tool without encountering any sharp edges. Just forward of member 22 is an air-chamber housing member 25. Just forward of housing member 25 is nose member 28. Nose member 28 is insulated from the rest of the housing by insulating plate member 30 and carries a seal 29 in which the forward end of fluid adhesive reservoir 31 is carried.

There are a number of co-operating functional subassemblies within housing 12. These include dispensing valve assembly 32 and best seen in FIG. 3; pneumatic control valve assembly and operating cylinder assembly 33; and adhesive-advancing assembly 36 which is operably connected to the pneumatic control valve assembly.

Dispensing valve assembly 32 comprises a needle valve member 38 connected by valve stem 40 to a valve-operating assembly 42. Valve operating assembly 42 is, in the first instance, controlled by the manual positioning of trigger 44. When trigger 44 is pulled, it causes a biasing means, spring 46, to be compressed by spring retaining flange 48, mounted on guide stem 41. Compression of spring 46 leaves needle valve 38 in a released position whereby fluid pressure may push it backwardly. A metal bellows 55 (best shown in FIG. 3) provides sufficient area 53a on which fluid adhesive can bear, to allow initiation of enough backward movement of stem 40 to open the valve and allow liquid adhesive to be dispensed from nozzle 90.

When the trigger is subsequently released, the valve 38 is closed by the resulting forward movement of guide stem 41 caused by expansion of spring 46 and the consequent pushing forward of valve stem 40.

Before trigger 40 is pulled to open valve 38 in condition to open, it is so arranged with respect to slide valve 54, that air entering the apparatus through conduit 18 may proceed through apertures 56 and 57, through conduit 58, and then through the main air cooling chamber 60, before leaving the apparatus through a flow path best illustrated in FIGS. 4 and 5. FIG. 5 is fragmentary view of front end plate 500. This end plate forms the front closure for chamber 60 and also comprises air conduit 58 therein. It further comprises an air conduit 502 offset by about 60 angular degrees from the bottommost point of plate 500. In conduit 502 is positioned a spring-biased ball valve 508 which is held open by about 10 to 15 psig and, therefore, allows air from chamber 60 to escape through conduit 502 up into subsidiary cooling chamber 64 whence it diffuses out of the gun from around washer 504 and ring 506. The 10 to 15 psig residual pressure aids markedly in the prompt response of the operating cylinder assembly 34 when the trigger is pulled.

Thus, it will be noted that when the trigger is in advanced position, that is before the trigger is pulled to place the gun in its adhesive-dispensing mode, air cooling is available to the adhesive being processed from those surfaces abutting cooling chambers 60 and 64. This cooling action is important in protecting an adhesive rod from excessive heating from electrical heating member 74 best seen in FIG. 6. This cooling feature provides a relatively sharp transition between the solid and liquid portions of the adhesive thereby allowing a minimum-sized tool to achieve a given adhesive-dispensing rate with a given adhesive. Moreover, it prevents premature softening of the adhesive with a consequent undersirable tendency to extrude into crevices of the tool; and it allows the stick to retain its shape and structure as a piston to a greater extent than it would were it subject to premature softening.

Another important aspect relating to this cooling is that it is discontinuous; i.e., it is not operative during the dispensing action and does not interfere with the heating of the adhesive. This allows greater adhesive-dispensing with less heat input than would be otherwise be required. This is achieved when slide valve 54, moved rearwardly with the rearward movement of trigger 44, valve seal member 54f cuts off the cooling air from entering the cooling system at aperture 57.

Figure 8:
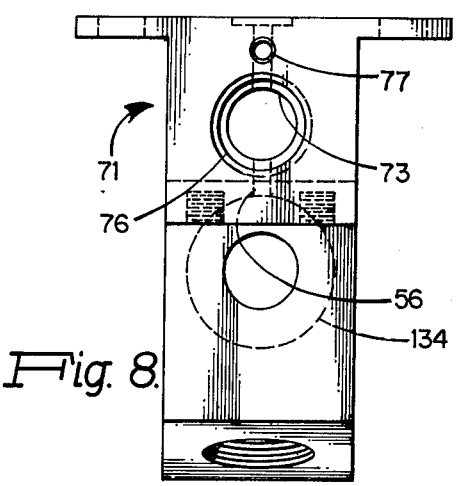
FIGS. 8 and 9 show side and rear views respectively of the housing for a pneumatic slide valve used in the apparatus of the invention.
Figure 10:
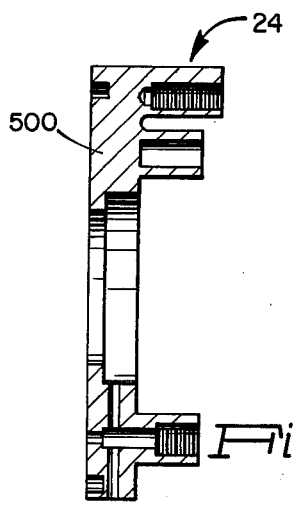
FIGS. 10 and 11 show section and front views of the back end plate of the pneumatic cylinder.
Figure 9:
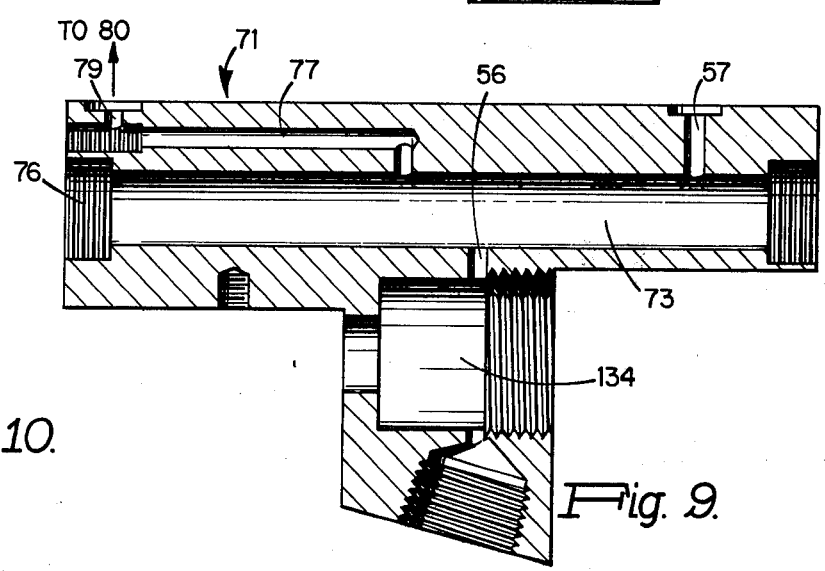
Figure 11:
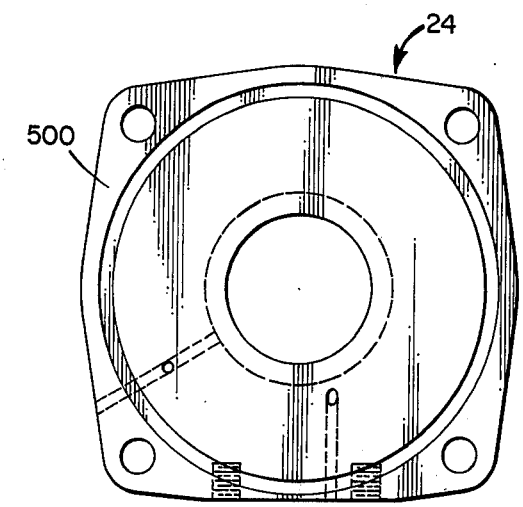

FIGS. 8 and 9 show detail of the slide valve housing member 71. It comprises a lateral conduit 77 leading from about the center of the valve bore 73 to an outlet port 79 towards the rear of slide valve housing member 71. As slide valve 54 moves backwardly compressing return spring 69, the rearward portion 75 of the valve, which also forms a spring-positioning cup, seals off an exhaust port 76. During the same backward movement, valve seal member 54r allows the air to be diverted, through conduits 77 and port 79 as best seen in FIG. 9, into an air passage 80 in rear face plate 24 of the pneumatic cylinder and thus behind annular piston member 82 of operating cylinder assembly 33. Piston member 82 is attached to adhesive advance assembly 36; thus, when the air drives the piston forward, it exerts a resultant pull on assembly 36.

The mechanical linkage between piston 82 and assembly 36 comprises a hollow operating cylinder 84 which is welded, or otherwise fastened, to a transition ring 88 and together these parts form means to connect the piston to a chuck assembly 89 (best seen in FIG. 2) which is formed of a chuck casing 91 and a chuck 92 which, on being advanced, causes three jaws 94 of the chuck assembly to be displaced inwardly, thereby pushing sharp ring-like ridge segments 96 into adhesive stick 72. A spring 115 biased between transition ring 88 (or, more exactly, cylinder lines 97) and chuck 92 keeps a minimum positive pressure between chuck and adhesive stick at all times. Thus, as the piston proceeds forward, the stick 72 is also pulled forward and causes the 72s portion of the adhesive to act as a piston against the 72L portion of adhesive which has been made fluid by the action of heater 74. The adhesive then moves through conduits 99 (See FIG. 3) and into valve 38.

A particularly important aspect of the feature wherein segments 96 bite into adhesive stick 72 is the outward displacement by segments 96 of a flange of solid adhesive. A new flange is created each time the adhesive is advanced. The flanges are wide enough to form a plurality wiping members as they proceed forward through the apparatus. In the illustrated apparatus, these flanges contact walls of cylinder liner 98 which cylinder is up to about 0.015 inches larger in diameter than the solid adhesive rod itself. This contact is important in avoiding undesirable backflow of liquid adhesive during operation of the apparatus.

It has already been disclosed that the movement of trigger 44 to the left removed the bias of spring 46 from needle valve 38. This is the situation as the adhesive 72s is forced forward by the action of piston 82 and the adhesive advance assembly. Movement of the adhesive increases pressure of adhesive 72L in fluid reservoir 31. This pressure bears against bellows 55 and pushes needle valve backwards, thereby allowing the adhesive to be dispensed from nozzle 90.

When the trigger is released, spring 46 returns the trigger to its forward position and cuts off the flow of adhesive through the needle valve. Slide valve 54 is also returned to the right until it abuts against a plug at the forward end of valve housing 71. As valve 54 returns, it allows air from behind the piston to escape through conduit 80 and exhaust port 76. The cooling air again enters aperture 57 and helps push the piston 82 to the left. As the piston returns, the adhesive-engaging assembly 36 also returns to its backward position.

The central adhesive pathway through the apparatus is lined by a first cylinder liner member 97 which comprises slots for retard pins 106. This liner serves as a means to suppress undesirable radial expansion of the adhesive stick. The retard pins 106 are carried on a second cylinder liner 98. Liner 97 comprises a flange which hooks around ring 88. A second cylinder liner 98 provides a sealing surface against which O-ring seals 100, positioned in annular slots about piston 82, may bear. It should be understood, that apparatus of the present invention may be used, with some adhesives, without a liner 98 and the O-rings may seal directly against the solid adhesive stick. However, for most versatile construction, metal liner means comprising a facing of a stick-resistant material like poly (tetrafluorethylene) polymer or silicone polymer is desirable. O-ring seals 101 are conveniently used to provide air seals between piston 82 and piston housing cylinder 85. O-ring seals 102 seal rear face plate and operating cylinder 84.

A retard pin 106 is carried on cylinder liner 98. The pin, engages the adhesive stick and prevents any rearward motion thereof. Similarly a biased brake member 110 is mounted in rear housing member 22 and carries a biting edge 112 which is biased into the adhesive stick by spring 113 to oppose any spurious backward movement of the stick.

Figure 12:
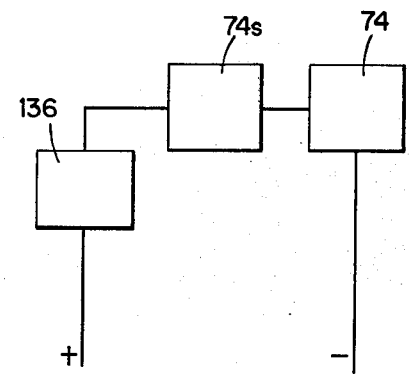
FIG. 12 is a schematic diagram of an electrical interlock circuit between heater and air supply.

Within handle 14 is a downwardly-extending portion 130 of valve housing member 71. In this portion of the valve (best seen in FIG. 9) is a pneumatically-activated valve 132 placed in a chamber 134. This valve actuates a switch 136 which, as shown in FIG. 12 is in series with heater switch 74s and prevents the heater from operating when there is no air being supplied to the apparatus.

There are a number of structural and operational features of the above apparatus which are of particular importance and specific merit discussion herein. These features are cooperatively arranged in the illustrated apparatus to provide a particularly advantageous dispensing gun. However, it is to be realized that each feature is itself a novel and important advance in the adhesive-dispensing art.

The advantages of the air cooling and the related feature whereby of the adhesive stick is cooled, at all times except those during which the adhesive is actually being advanced, have been discussed above. However, also of particular advantage is the basic design whereby the piston is an annular member with the adhesive stick running therethrough. Not only does this concentric design allow a very compact, easy-to-handle, and thus safe, dispensing tool for hot-melt adhesives; but, it also provides the annular piston chamber for cooling purposes.

The annular collet-type gripping means is also highly advantageous. It has been discovered that an advancement means which grips the adhesive with a force distributed substantially over the entire periphery of the adhesive, allows a more-controlled advance of the piston and avoids force vectors being applied to the stick which, in the case of some adhesives, tend to cause the stick to bend or adhere to one side of the pathway as it is pushed through the apparatus. In general, it is usually most advantageous to have three or more ring segments such as at 96, mounted for advancing the adhesive. But even a number of studs adapted to be driven into the adhesive and evenly-spaced, preferably no less than about 45 angular degrees apart, represent an advancement over the art.

Another advantage of the method by which the adhesive stick is engaged is the fact that the degree of bite is proportional to the resistance to flow of the adhesive. As the resistance grows, the studs or ring members bite more deeply into the adhesive and achieve the desired degree of engagement with the adhesive stick.

Thus, the above advantages, together with such advantages as are achieved by a single power source for operating the stick-engaging and piston-feed, the lack of any wearing parts, the ability to handle very long sticks of adhesive.

It is also to be understood that the following claims are intended to cover all the generic and specific features of the invention herein described, and all statements of the scope of the invention which, as a matter of language, might be said to fall therebetween.

What is claimed is:

1. In a hot-melt manually-operated adhesive applicator for receiving a continuous solid rod of hot-melt adhesive material and dispensing said adhesive in melted form, said applicator comprising a central passageway for moving a solid rod of adhesive through said apparatus into a heating zone from which it is dispensed in melt form, the improvement wherein:
   a. an annular pneumatic cylinder is arranged around said central passageway, said cylinder comprising an annular piston adapted for reciprocal motion in response to air pressure alternately admitted into and relieved from said cylinder; said piston forming means to actuate an advancement assembly for intermittent engagement and advancement of said adhesive on the forward stroke of said piston;
   b. and wherein said pneumatic cylinder comprises, when said piston is retracted, a conduit for conduction of cooling air around said adhesive rod between said heating zone and said retracted piston.

2. An applicator as defined in claim 1 wherein said advancement assembly for said adhesive rod comprises means adapted to engage said stick around substantially the entire periphery thereof.

3. An applicator as defined in claim 1 wherein said advancement assembly comprises a segmented collet means which includes a chuck adapted to push a plurality of adhesive engaging members into positive engagement with said adhesive rod.

4. An applicator as defined in claim 1 including means to stop flow of cooling air when said piston is urged toward its extended position.

5. Apparatus as defined in claim 3 wherein said engaging members are adapted to dig deeper into an adhesive rod when the resistance to movement of the stick through the passageway is greater.

6. Apparatus as defined in claim 2 wherein said means adapted to engage said rod also forms means to form a flange of solid adhesive about the periphery of said rod, the diameter of said flange being at least the diameter of said passageway.

7. Apparatus as defined in claim 3 wherein said engaging members also form means to form a flange of solid adhesive about the periphery of said rod, the diameter of said flange being at least the diameter of said passageway.

8. A compact, hot-melt, adhesive-dispensing apparatus of the type adapted to receive a continuous rod of solid adhesive, melt it, and continuously dispense it therefrom by operation of a pneumatically-operated driving force, the improvement wherein (1) a pneumatic cylinder is arranged around a portion of said rod being fed through said apparatus (2) a piston is disposed for movement in said cylinder and (3) gripping means are operably connected to the piston of said cylinder, said gripping means being adapted to grip said solid adhesive rod on a forward stroke of said piston and to advance said rod during said forward stroke; and wherein said gripping means also forms means to form a flange of solid adhesive about the periphery of said rod the diameter of said flange being at least the diameter of said passageway.

9. Apparatus as defined in claim 8 wherein said gripping means for said adhesive rod comprises means adapted to engage said rod around substantially the entire periphery thereof.

10. Apparatus as defined in claim 8 wherein said gripping means comprises a segmented collet means which includes a chuck adapted to push a plurality of adhesive engaging members into positive engagement with said rod.

11. In a process for dispensing liquid adhesive from an applicator, said process comprising the steps of progressively moving a rod of solid adhesive into a heating zone by means of a pneumatically operated cylinder, melting it, and dispensing it pneumatically, the improvement comprising the steps of
   1. advancing the rod through an annularly-shaped piston operating in said pneumatic cylinder which cylinder is also around a portion of said rod; and
   2. passing cooling air through said cylinder when said piston is in retracted; i.e., non-dispensing, position but cutting off said cooling air when said piston is urged toward an advanced, i.e., dispensing, position.

12. In a process for dispensing liquid adhesive from an applicator, said process comprising the steps of progressively moving a rod of solid adhesive through a cylindrical pathway into a heating zone, melting the adhesive and dispensing it by intermittently pushing it forward by force applied to said rod, the improvement comprising the steps of mechanically displacing a flange of solid adhesive on each intermittent pushing action and causing such displaced flange to form seal means between said rod and said cylindrical pathway, said flange forming means to seal against backflow of liquid adhesive.

13. A process as defined in claim 12 comprising the additional steps of
   1. advancing the rod through an annularly-shaped piston operating in a pneumatic cylinder which is also around a portion of said rod; and
   2. passing cooling air through said cylinder when said piston is in retracted; i.e., non-dispensing, position but cutting off said cooling air when said piston is urged toward an advanced, i.e., dispensing, position.

* * * * *

UNITED STATES PATENT OFFICE
CERTIFICATE OF CORRECTION

Patent No. 3,964,644        Dated June 22, 1976

Inventor(s) Ray H. Wallace

It is certified that error appears in the above-identified patent and that said Letters Patent are hereby corrected as shown below:

Column 3, line 26, "40" should read -- 44 --.

Column 3, line 44, "34" should read -- 33 --.

Signed and Sealed this

Thirtieth Day of November 1976

[SEAL]

Attest:

RUTH C. MASON
Attesting Officer

C. MARSHALL DANN
Commissioner of Patents and Trademarks